F. MAXIMILIAN.
MITERING MACHINE.
APPLICATION FILED MAY 1, 1912. RENEWED NOV. 22, 1913.
1,083,119.
Patented Dec. 30, 1913.
2 SHEETS—SHEET 1.
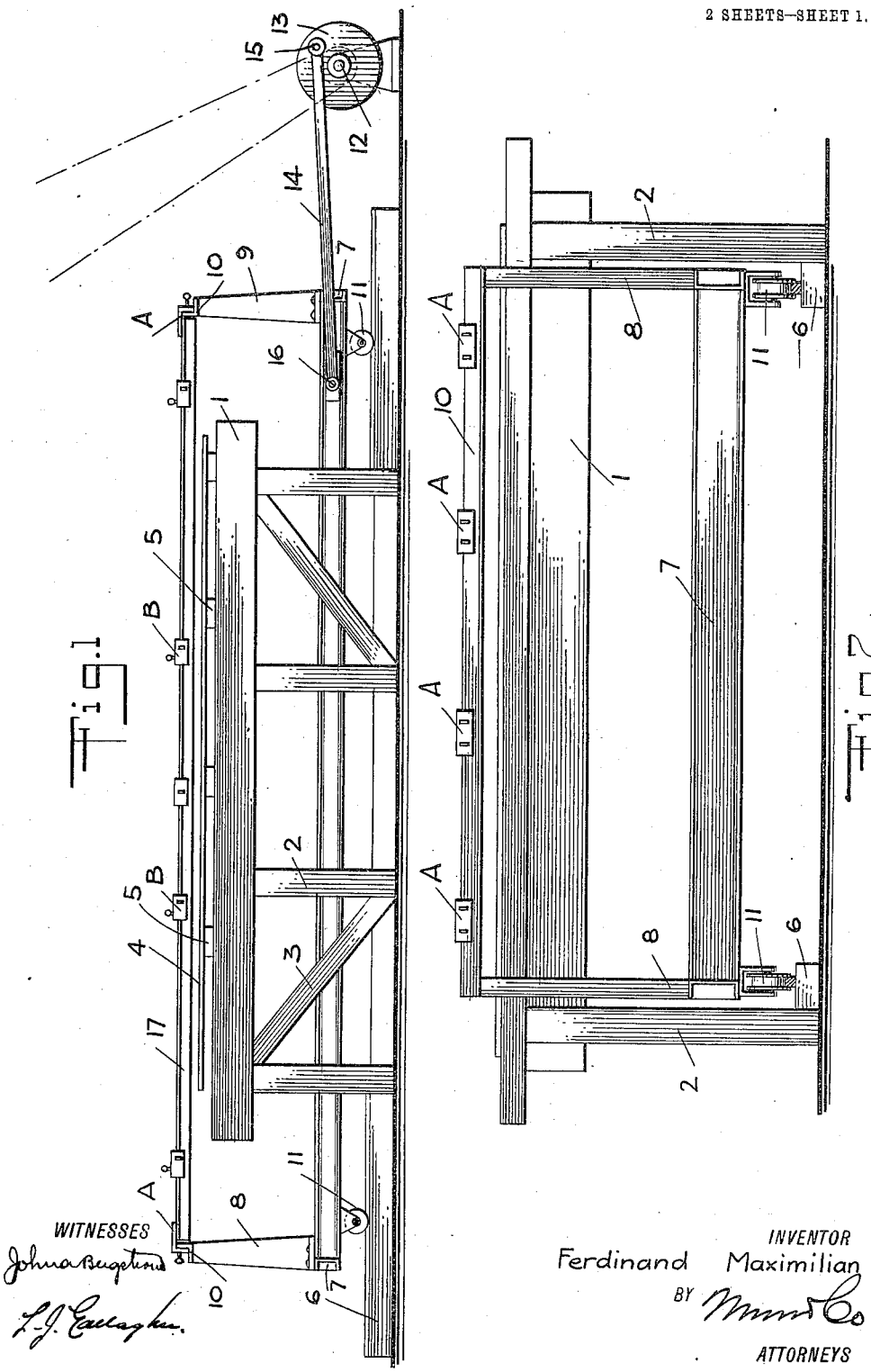

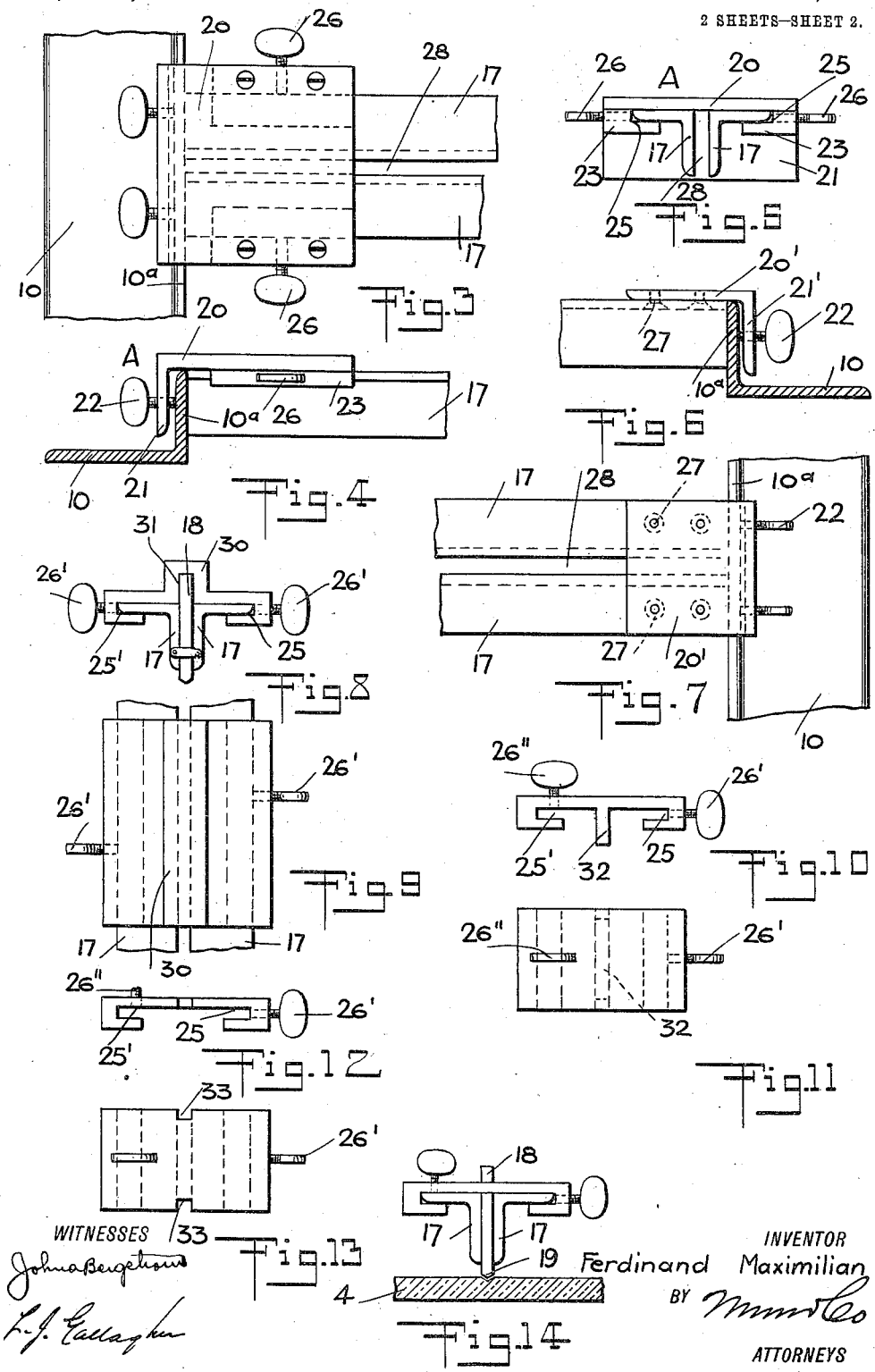

UNITED STATES PATENT OFFICE.

FERDINAND MAXIMILIAN, OF CLIFFSIDE PARK, NEW JERSEY, ASSIGNOR TO JACQUES KAHN, OF NEW YORK, N. Y.

MITERING-MACHINE.

1,083,119. Specification of Letters Patent. Patented Dec. 30, 1913.

Application filed May 1, 1912, Serial No. 694,459. Renewed November 22, 1913. Serial No. 802,557.

*To all whom it may concern:*

Be it known that I, FERDINAND MAXIMILIAN, a citizen of the United States, and a resident of Cliffside Park, in the county of Bergen and State of New Jersey, have invented a new Mitering-Machine, of which the following is a full, clear, and exact description.

My invention relates generally to mitering machines, and more particularly is directed to a new and improved construction especially adapted for glass-working.

The principal object of my invention is to provide a machine especially adapted to miter glass through the aid of suitable tools, the construction and arrangement being such that feeding means for the said tools is avoided.

A further object of my invention is to provide a new and improved mitering machine especially adapted for glass-working, the machine comprising a suitable tool, which, by a reciprocating movement in contact with the glass, miters the same, the purpose being the production of ornamental sheets of glass.

Other objects and advantages of the invention will appear as the description thereof proceeds, all of which are particularly pointed out and included in the appended claims.

Figure 1 is a side view of the machine as an entirety; Fig. 2 is an end view thereof; Fig. 3 is a plan view of one of the clamps used in holding the guides in position; Fig. 4 is a side view thereof; Fig. 5 is an end view thereof; Fig. 6 is a side view of a modified form of the clamp; Fig. 7 is a top plan view; Fig. 8 is an end view of a clamp for engagement with the guides in order to hold the mitering tool in position; Fig. 9 is a top plan view thereof; Fig. 10 is an end view of another form of clamp adapted for the same purpose; Fig. 11 is a top plan view; Fig. 12 is an end view of another form of clamp for the same purpose; Fig. 13 is a top plan view thereof; and Fig. 14 is a partial sectional view through a sheet of glass showing the relation of the guides, one of the clamps and the mitering tool thereto.

Referring particularly to Figs. 1 and 2, the machine comprises any suitable stationary table 1 maintained at a suitable height in any desirable manner, as by means of uprights 2, the uprights being braced if so desired by means of diagonals 3, the top of the table being adapted to support a sheet of glass 4 which rests on any suitable and desirable rest 5. Below the table and preferably between the uprights 2 at opposite sides thereof, are the fixed tracks 6 on which a carriage reciprocates back and forth, the carriage being made up of a suitable lower frame 7 at the ends of which are uprights 8—9, the uprights at each end being connected by suitable horizontally extending members 10, as shown particularly in Fig. 2.

All of the parts heretofore described, especially those which make up the reciprocating carriage, may be conveniently and in some cases most desirably made of angle iron of any suitable size and shape in order to provide for low cost of production.

Adjacent the ends of the reciprocating carriage, and on each side thereof, are the rollers 11 revolubly mounted in position and adapted to move back and forth along the fixed tracks or rails 6, whereby movement of the carriage is guided.

The carriage is reciprocated in any suitable manner, the construction shown in Fig. 1 being preferred, such construction embodying a revoluble shaft 12 having a crank disk 13 thereon, there being a pitman 14 pivoted to the disk at 15, the other end of the pitman being pivoted to the carriage at 16; it is obvious that as the shaft 12 is rotated in either direction by any suitable means that rotation of the crank disk will move the carriage back and forth through the medium of the pitman.

Extending longitudinally of the carriage and at a suitable height above the top of the table 1, and hence in a plane above the sheet of glass 4, are the guides 17, which (Fig. 14) are preferably angle irons, the number of which as well as the size depends on different circumstances; it is essential, however, that two angle irons arranged as shown in Fig. 14 be so arranged that they coöperate to form guides between the vertically extending sides of which are positioned any desirable number of tools 18, each of which has a beveled lower edge portion 19. The ends of these angle irons are supported by the horizontally extending members 10 carried by the end pieces 7 of the carriage. In working glass, or rather, in mitering different pieces of glass which vary in size, it is necessary that the guides 17 be movable to a plurality of positions in order that the tools 18 may form different designs in the glass, and to this end the clamps A of Fig. 1, shown particularly in Figs. 3 to 7, inclusive, are made use of.

Referring particularly to Figs. 3, 4 and 5, the clamp A comprises a body member made up of the two right-angularly extending portions 20—21, the portion 21 which is vertically extending being provided with thumb screws 22 extending therethrough; to the under side of the horizontally extending portion 20 of this clamp, and along opposite edge portions thereof, are the L-shaped pieces 23 which are secured to the said portion 20 in any suitable manner, preferably by means of screws 24, the arrangement being such that when the parts are in position, as shown in Fig. 5, pockets 25 are provided into which the ends of the guide or angle iron are received. The distance between the vertical side walls at the ends of the pockets is substantially greater than the combined widths of the irons or guides 17, each side of the clamp A being therefore provided with a plurality of adjustable thumb screws 26, the inner ends of which extend into the above-mentioned pockets and adapted for engagement with edge portions of the guides 17 in order to move them closer together, as the case may be. It will be noted that if one of the clamps A is positioned at each end and in engagement with two of the guides 17 such guides will be held in position in the pockets 25, the clamps being retained on the horizontally extending cross pieces or members 10 by engagement of the thumb screws 22 in the vertically extending portion 21 of the clamps by engagement with the side of the upstanding portion 10ª of the said horizontally extending members 10. The provision of the thumb screws serves to maintain the guides 17 in any desired positions and spaced from each other, the pressure between the thumb screws 22 and the horizontally extending members 10 being sufficient to insure such adjustment.

In place of the clamp A a modified arrangement may be used, such as is shown particularly in Figs. 6 and 7. In this case the clamp comprises the horizontally extending portion 20′ and the vertically extending portion 21′, together with the thumb screws 22 such as previously described. In this case, however, the ends of the guides 17 in place of being adjustably carried in the pockets 25 of the clamp are firmly secured to the horizontally extending portion 20′ by any suitable means such as screws or bolts 27. In this event the guides are not adjustable with respect to each other, but the open distance or space 28 between the downwardly extending portions of these guides is fixed.

Suitably spaced along each pair of cooperating guides 17 are other clamps B, the purpose of which is to properly space the guides from each other in order to provide for securely holding the beveling tools 18 in position, and also to provide fixed portions for engagement with the ends of these tools in order to insure movement of the tools during operation of the machine.

Referring particularly to Figs. 8 and 9, the clamp therein shown is preferably of integral construction, being provided on its under side with pockets 25′ into which the horizontally extending portions of the guides 17 extend, opposite sides of the clamp being provided with thumb screws 26′ adapted for engagement with the edge portions of the horizontally extending parts of the clamps in order to properly space them and maintain any proper distance between the vertically extending portions of the clamps to receive the mitering tool 18; if so desired the intermediate upper portion of the clamp may be provided with a longitudinally extending rib 30 provided with a channel 31 extending therethrough into which the upper portion of the tool 18 is received.

In place of the clamp shown in Figs. 8 and 9 that set forth in Figs. 10 and 11 may be made use of, this clamp differing from that shown in said Figs. 8 and 9 in the omission of the longitudinally extending rib 30 on the upper side and in the provision of a downwardly extending rib 32 the width of which is substantially equal to that of the mitering tool 18, so that this downwardly extending rib may be placed between the guides 17 after which the clamp may be secured on the guides by tightening the thumb screw 26′ similar to that shown in Fig. 8, and the thumb screw 26″ which extends in a vertical direction rather than horizontal. This clamp is provided with pockets 25—25′ similar to the device of Fig. 8 and adapted for the same purpose.

If so desired a further construction, such as that illustrated in Figs. 12 and 13, may be availed of, this structure differing from that of Figs. 10 and 11 in the omission of the downwardly extending rib 32 which extends between the spaces of the guides 17. The pockets 25—25′ serve the same purpose as similar pockets in the devices of Figs. 8 and 10, the proper spacing of the guides 17 in this instance being obtained by means of the thumb screw 26′ which extends laterally of the clamp. In order to provide a convenient gage for the proper width of the open space between the guides 17, as well as to provide pockets into which the mitering tools may be placed, opposite edge portions of the top of the clamp are provided with recesses 33, the width of which is substantially equal to the thickness of the mitering tool or to the distance which is maintained between the guides, which open space receives these tools.

In the description of the construction of this mitering machine it will be noted that no means has been set forth for feeding of the parts relatively to each other, or for feeding glass relatively to any one of the parts as the mitering thereof continues, the construction and arrangement being such that means for this purpose is dispensed with, the same function being obtained in the following manner:— Referring particularly to Fig. 14, it will be noted that the mitering tool 18 extends to a higher elevation than the tops of the guides 17; these tools 18, to any desired number, are loosely positioned between the guides 17 and the travel of the tools relatively to the guides when the guides are reciprocated is determined by the clamps situated along the guides, the several clamps being preferably spaced along the guides according to the lengths of the tools 18; it is clear that if the guides 17 are reciprocated the mitering tools 18, which are confined between the guides on their sides and the clamps at their ends and which rest on top of the sheet of glass 4, are maintained in contact with such sheet solely by reason of their own weight; continuous operation of the machine and further mitering of the glass being provided for through the medium of the tools 18 which gradually work down between the guides as the glass becomes cut away. Thus separate means for providing relative movement between the tools and the glass is avoided, the tools which are of metal being of sufficient weight to maintain close contact with the glass, whereby a number of beveled channels may be formed; the number of tools depends primarily upon the size of the sheet of glass as well as the design to be formed therein, the inventive idea being to provide a machine of such size that it may take care of sheets of glass of varying sizes.

Having thus described my invention, what I claim as new and desire to secure by Letters Patent is:—

1. A mitering machine, comprising a table, means on the table for supporting sheets of glass of various sizes, a reciprocating carriage, means for moving the carriage, a plurality of movable and adjustable guides carried by the carriage and extending above the said sheet of glass, clamps engaging the guides, and beveling tools between the guides and clamps, the movement of the beveling tools being determined by the said clamps.

2. A mitering machine, comprising a table adapted to support a sheet of glass, a reciprocating carriage adjacent the table, means for moving the carriage, a plurality of bars extending longitudinally of the carriage and positioned above the glass, the bars being spaced a suitable distance, a beveling tool in the space between the bars, the said tool engaging the glass and being maintained in such engagement by reason of its weight, clamps adjacent the ends of the bars for holding them in position, and other clamps engaging the bars intermediate the ends whereby the bars are maintained properly spaced and the position and movement of the tool are determined.

3. The combination of a plurality of guides, clamps at the ends thereof for holding the guides in spaced relation, beveling tools positioned between the guides, and clamps engaging the guides intermediate the ends whereby the guides may be maintained in proper relative position and movement of the said tools may be insured when the guides reciprocate.

In testimony whereof I have signed my name to this specification in the presence of two subscribing witnesses.

FERDINAND MAXIMILIAN.

Witnesses:
LAURENCE J. GALLAGHER,
PHILIP D. ROLLHAUS.

---

Copies of this patent may be obtained for five cents each, by addressing the "Commissioner of Patents, Washington, D. C."